April 13, 1926.  
T. F. McKEIGHAN  
1,580,746  
FEEDING DEVICE FOR AUTOMATIC SCALES  
Filed April 30, 1924  
2 Sheets-Sheet 1
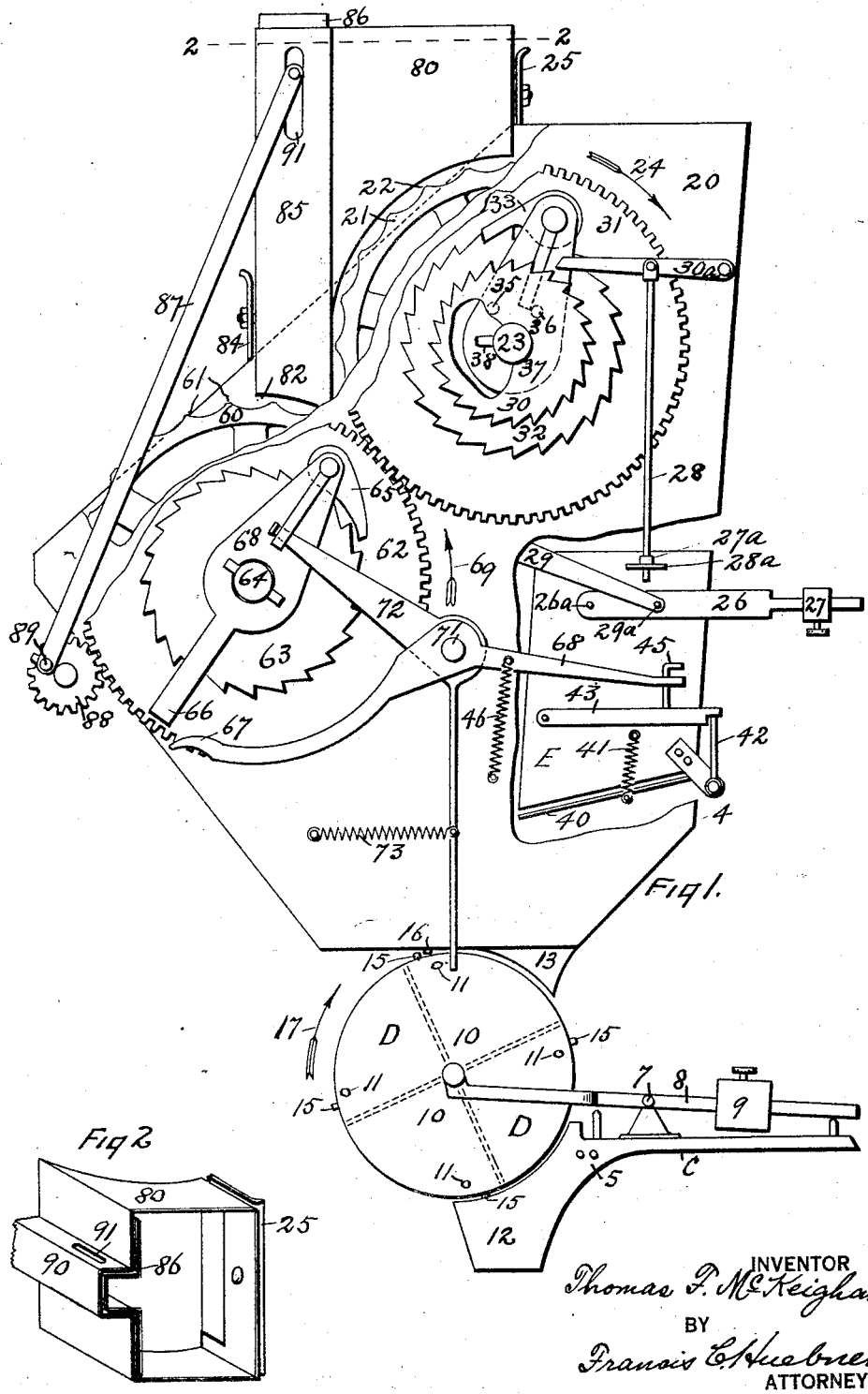
INVENTOR  
Thomas F. McKeighan  
BY  
Francis C. Huebner  
ATTORNEY April 13, 1926.
T. F. McKEIGHAN
1,580,746
FEEDING DEVICE FOR AUTOMATIC SCALES
Filed April 30, 1924    2 Sheets-Sheet 2
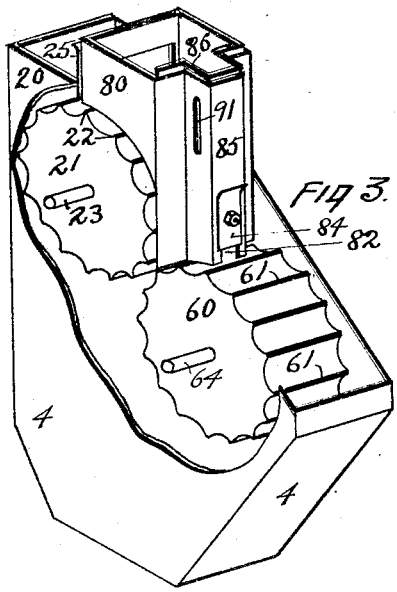
INVENTOR
Thomas F. McKeighan
BY
ATTORNEY Patented Apr. 13, 1926.

1,580,746

UNITED STATES PATENT OFFICE.

THOMAS F. McKEIGHAN, OF FRESNO, CALIFORNIA, ASSIGNOR TO SUN-MAID RAISIN GROWERS ASSOCIATION, OF FRESNO, CALIFORNIA.

FEEDING DEVICE FOR AUTOMATIC SCALES.

Application filed April 30, 1924. Serial No. 709,991.

*To all whom it may concern:*

Be it known that I, THOMAS F. McKEIGHAN, a citizen of the United States, and resident of Fresno, in the county of Fresno and the State of California, have invented a new and useful Improvement in a Feeding Device for Automatic Scales, of which the following is a specification.

My invention relates to an automatic weighing machine which is adapted for weighing raisins and similar products. The object I have accomplished is accuracy and speed in automatic weighing, and my invention for accomplishing these objects is an improved means for feeding the product into the hopper or hoppers in a main stream and in a positive dribble stream so that the flow can be stopped the instant the required weight is in the scale hopper.

I accomplish this and other objects by means of the device hereinafter described and illustrated on the accompanying drawing, in which Figure 1 shows a side view of the device. Figure 2 is a sectional view of the hopper along the broken line 2—2 partly in perspective. Figure 3 shows a front view with the housing cut away to show the interior workings.

In said drawing, C represents the automatic scales consisting of a base 5 having a pedestal 6 to which is pivoted a balancing beam 8 at the pivot point 7. Movable weight 9 is slidably attached to the beam on one side of pivot 7 and a hopper D is constructed of a plurality of compartments 10, of equal size, which are arranged on a circular frame adapted to rotate on the end of balancing beam 8. The compartments are open on the periphery of the frame and are positioned so that one compartment is under a discharge opening 13 in the feeding device hereinafter explained. Each compartment of the hopper is provided with a catch 15 which engages with a stop 16 attached to the housing of the feeding device when the weight in the hopper is under the amount required to raise the movable weight 9. But when the weight in the compartment 10 is sufficient to raise movable weight 9, the catch 15 is disengaged with stop 16, and by gravity occasioned by the raisins in compartment 10, hopper D turns on its axis so that the contents of the compartment is spilled into a funnel or discharge opening 12, and then the next adjacent compartment is positioned under the discharge opening and held in that position by the engagement of catch 15 with stop 16. The arrow 17 indicates the direction of the rotation of the hopper D.

The feeder consists of a dual arrangement of a main feed and a dribble feed. The main feed consists of a housing 20 which is adapted to hold the pivots, stops and bearings hereinafter set forth, and for other purposes disclosed. The main features consist of a drum 21 having a lateral corrugated periphery, the corrugations being indicated by the numeral 22. The drum is adapted to rotate with a shaft 23 to which it is attached. Arrow 24 indicates the direction of rotation of drum 21. Directly above the drum is a container for raisins or merchandise to be weighed, which container has an opening at the bottom for discharging its contents on the periphery of drum 21. The hopper is positioned so that the discharge opening covers approximately one-fourth of the periphery of the drum just before it reaches the highest point in its line of travel. By the rotation of the drum the raisins thus deposited are carried over and spilled into an auxiliary hopper E. The flow of the raisins over the drum 21 is regulated by an adjustable gate 25. Auxiliary hopper E is pivoted at pivot point $26^a$ to a weight arm 26, and weight arm 26 is pivoted to a supporting arm 29 at pivot point $29^a$. Weight arm 26 carries an auxiliary adjustable weight 27 to balance the required weight in the hopper. When raisins sufficient to balance weight 27 are placed in hopper E, the arm 26 is lowered and releases a rod 28 which by gravity actuates a latch $30^a$ to engage and stop the rotation of a ratchet wheel 30. Ratchet wheel 30 has a slight oscillation on shaft 23. The guide $28^a$ attached to hopper E serves to direct rod 28, and the stop $27^a$ limits the movement of the rod. This stop engagement of ratchet wheel 30 is held as long as the full predetermined weight is in auxiliary hopper E, and functions to stop the rotation of the drum 21, and thereby stops the feed of merchandise into the auxiliary hopper E. Drum 21 is rotated by a gear 31, which normally rotates and idles on the shaft 23 to which shaft the drum is attached. To gear 31 is attached concentric thereto a ratchet wheel 32. A locking device member, 37, is keyed to shaft 23 by means of a pin 38. To the member 37 is pivoted a pawl 33 which is positioned to engage a ratchet wheel 32, which is attached to gear 31. The pawl 33 has a depending arm which engages with a pin 36 when latch 30$^a$ stops oscillating ratchet wheel 30, and the pawl is thus released from the ratchet wheel 32, which runs idle on shaft 23 when the hopper E has the predetermined weight therein. When the weight in hopper E is removed, the latch 30$^a$ is disengaged with ratchet wheel 30, the pawl 33 interlocks with the ratchet wheel 32, and the drum 31 is then in operative relation to feed raisins into auxiliary hopper E.

The dribble feeder consists of a drum 60, constructed with corrugations 61 extending laterally on its periphery, which drum is attached to a shaft 64 and rotates with it, shaft 64 being driven by a cog gear 62 which meshes with the gear 31. The direction of the rotation of drum 60 is indicated by the arrow 69. To shaft 64 is attached a ratchet wheel 63. A member 68 is adapted to rotate on shaft 64, and carries on one end a pawl 65, which is adapted to engage ratchet wheel 63, and carries on the other end a cam 66 which is adapted to depress the cam lever 67.

The feeding device for the dribble stream consists of a portion of main hopper 80 preferably formed into a vertical channel 85, said channel being positioned so that an opening 82 at the lower edge of said hopper is directly over the periphery of the dribble stream drum just before it reaches its highest point in its revolutions. An adjustable gate, 84, is adapted to cut off the normal flow of raisins through said opening 82. This channel forms a slideway in which a slide 86 is adapted to have a vertical movement. This movement is imparted by a connecting rod 87 pivoted to the slide 86 at pivot point 90, operable through a slot 91, which connecting rod is pivoted to a crank 89 on a cog gear 88 which meshes with cog gear 62. The slide rubs against the mass of raisins within the hopper and by friction and gravity combined, the raisins are thus worked toward, and through the opening 82 to form the dribble stream. If these raisins were dependent alone on gravity to be thus delivered in a stream as small as is necessary to accomplish the object desired, the opening which is necessarily restricted to limit the amount of raisins coming therefrom would become closed by the adhesion of the raisins to the wall of the hopper and adhering together at said opening. But by the friction feed described, combined with the position of the hopper which uses gravity to assist in the feeding of the raisins, and having the dribble feed coming directly from a large hopper, a constant and uniform stream is accomplished.

The auxiliary hopper is timed to spill its contents into the scale hopper D as follows: Auxiliary hopper E has a hinged bottom 40, which is normally brought into a closed position when empty by a spring 41. When the bottom is closed, an arm 42 has a notch 42$^a$ which engages a latch 43, which functions to hold the bottom in a closed position, notwithstanding the weight in the hopper is beyond the strength of spring 41. On each compartment 10 of hopper D is a stud 11, which moves a lever 70 as the hopper D rotates. Lever 70 is pivoted at point 71 to the housing, and has an extension 72. To shaft 64 is keyed a member having at one end pawl 65 and at the other end a cam 66. The engagement of pawl 65 with ratchet wheel 63 causes member 68 to rotate with cog gear 62 in the direction shown by the arrow 69, and cam 66 engages with a cam lever trip 67, which moves a trip arm 68 upward, engaging it with a trip 45, which in turn releases the catch holding the bottom of hopper E in a closed position, and by gravity the raisins in hopper E open the bottom of hopper E and the contents are deposited through the funnel 13 into the compartment 10 in scale hopper D, positioned to receive the bulk load. Spring 46 normally holds trip arm 68 so it is not in engagement with trip 45. Spring 73 normally holds levers 70 in a position to make pawl 65 inoperative.

The bulk load thus deposited in the scale is under the required weight demanded of scale C, said bulk weight being governed by the auxiliary scale weight 27.

The dribble stream fed over drum 60 is continuously running into hopper 10, and when the accurate weight is therein, the hopper D rotates, discharging the finished weight of raisins through a funnel 12, positioning another hopper compartment 10, dumping the preweighed contents of auxiliary hopper E into the functioning hopper compartment, thereby releasing the stopping mechanism functioning with drum 21, and permitting another bulk charge to be preweighed for discharging into the empty hopper compartment 10 which is next positioned to receive the bulk load.

It is also noted that all of the parts of this device cooperate so that the auxiliary scale E stops functioning after the predetermined weight is in the hopper of said scale E, until the finishing scale is ready to receive the load.

It is noted that while raisins have been referred to as the class of merchandise for which this device is peculiarly adapted, my claims are intended to cover all classes of merchandise.

Having described my invention, I claim as new and ask for Letters Patent:

1. In an automatic scale having means for feeding a bulk stream and a dribble stream into the automatic scale hopper, said bulk stream being fed intermittently at intervals determined by a predetermined under weight placed within said hopper, and said dribble stream being fed by means consisting of a feeding chamber, a dribble stream discharge opening therein, a vertical slideway within the chamber, and having one end thereof adjacent to the dribble stream discharge opening, a slide adapted to have a vertical movement within the slideway, and means for imparting a reciprocating movement to said slide.

2. In a device of the character described, a cylinder adapted to revolve on its axis, a hopper directly over the cylinder having an opening positioned so merchandise in said hopper will flow therefrom on said cylinder and be deposited on said cylinder on a portion of the periphery adjacent to its highest point on its line of travel, a slide within said hopper terminating at one end at the discharge opening adapted to have an up and down motion on the rotation of the cylinder.

3. In a device of the character described, the combination of a bulk feed cylinder and a dribble feed cylinder positioned so each can rotate independently of the other, and the peripheries will approximately meet, and so a line connecting the axes will be approximately forty-five degrees from a perpendicular line, means for rotating said cylinders, and a hopper for receiving and discharging merchandise, said hopper being positioned above said cylinders, so the discharge openings therein are directly over arcs of the cylinders extending between the hightest points thereon and toward the directions from which the cylinders are rotating.

4. In a device of the character described, the combination of a bulk feed cylinder and a dribble feed cylinder positioned so each can rotate independently of the other, and the peripheries will approximately meet, and so a line connecting the axes will be approximately forty-five degrees from a perpendicular line, means for rotating said cylinders, and a hopper for receiving and discharging merchandise, said hopper being positioned above said cylinders, so the discharge openings therein are directly over arcs of the cylinders extending between the highest points thereon and toward the directions from which the cylinders are rotating, together with adjustable slides for regulating the size of the openings.

5. In a feeding device for an automatic scale, the combination of a finishing scale, means for continuously feeding a dribble stream of merchandise into the finishing scale hopper, and an auxiliary scale having a hopper adapted to discharge its contents into the finishing scale hopper, said discharge being timed by the positioning of an empty finishing scale hopper to receive said contents, the auxiliary scale being positioned to receive a flow of merchandise from a feeder, means for cutting off the flow of the raisins into the hopper of the auxiliary scale when a predetermined weight is therein, said predetermined weight for the auxiliary scale being less than the predetermined weight for the finishing scale, and means for positioning an empty hopper on the finishing scale to receive the discharge from the auxiliary hopper and from the dribble feeder when a hopper of the finishing scale having a predetermined weight therein is removed.

6. In a device for feeding merchandise in a steady stream consisting of a hopper, a vertical slideway on one side of the hopper and a slide adapted to be moved upward and downward therein, a discharge opening in said hopper adjacent to the lower end of the slideway, a roller having lateral corrugations positioned so the periphery is directly under the discharge opening and means for rotating the roller and actuating the slide, substantially as described.

7. In a device for feeding merchandise consisting of a hopper having a vertical slideway within the hopper and a slide operable in the slideway, and adapted to agitate the merchandise within the hopper, a discharge opening adjacent to the lower end of the slideway in the bottom of the hopper and means for giving the slide an up and down movement.

8. In a device for feeding merchandise in a stream consisting of a hopper having a discharge opening in the bottom thereof, slide guides positioned in relation to the discharge opening so that a slide operable therein will move away and toward the discharge opening, a slide operable within the guides and adapted to agitate the merchandise within the hopper, and means for imparting a reciprocating movement to the slide.

9. In a device of the character described the combination of an automatic finishing scale having trip means thereon for emptying the hopper of the finishing scale and for positioning another empty hopper to receive merchandise from a discharge opening in a bulk scale hopper, said finishing scale having a plurality of hoppers attached to a common axis and positioned on said axis so that said hoppers follow a common path in the rotation of the axis and consecutively pass under said discharge opening, said trip being actuated by the weight of the merchandise in the finishing hopper immediately prior to the time it is emptied, an auxiliary bulk scale adapted to receive merchandise from a compartment, auxiliary trip means to cut off the flow of merchandise when the weight in the auxiliary bulk hopper is slightly less than the predetermined weight, said auxiliary trip means being actuated by a fixed weight in the auxiliary bulk hopper, and means for discharging the contents of the auxiliary bulk hopper into the automatic finishing scale hopper actuated by trip means which functions on the emptying of the finishing scale hopper.

THOMAS F. McKEIGHAN.